(12) United States Patent  (10) Patent No.: US 7,703,993 B1
Darbinyan et al.  (45) Date of Patent: Apr. 27, 2010

(54) WAFER LEVEL OPTOELECTRONIC PACKAGE WITH FIBER SIDE INSERTION

(75) Inventors: Artur Darbinyan, Santa Clara, CA (US); Luu Nguyen, San Jose, CA (US); Anindya Poddar, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 12/337,533

(22) Filed: Dec. 17, 2008

(51) Int. Cl.
  G02B 6/36 (2006.01)
(52) U.S. Cl. .......................... 385/92; 385/88
(58) Field of Classification Search ............... None
  See application file for complete search history.

(56) References Cited

U.S. PATENT DOCUMENTS

| | | | |
|---|---|---|---|
| 5,987,202 A | | 11/1999 | Gruenwald et al. |
| 2002/0131727 A1 | * | 9/2002 | Reedy et al. .................. 385/88 |
| 2003/0118288 A1 | | 6/2003 | Korenaga et al. |
| 2003/0118822 A1 | * | 6/2003 | Jahns et al. ............... 428/402.2 |
| 2004/0033031 A1 | * | 2/2004 | Zaborsky et al. .............. 385/89 |
| 2005/0180681 A1 | * | 8/2005 | Umebayshi et al. ........... 385/15 |
| 2006/0022289 A1 | * | 2/2006 | Badhei et al. ............... 257/432 |
| 2008/0136955 A1 | | 6/2008 | Kathman et al. |
| 2008/0282742 A1 | * | 11/2008 | Colgan et al. ................. 65/406 |

OTHER PUBLICATIONS

U.S. Appl. No. 12/358,143, filed Jan. 22, 2009.
Office Action dated Dec. 22, 2009 in U.S. Appl. No. 12/358,143.
Office Action dated Sep. 17, 2009 in U.S. Appl. No. 12/358,143.

* cited by examiner

*Primary Examiner*—Sung H Pak
(74) *Attorney, Agent, or Firm*—Beyer Law Group LLP

(57) ABSTRACT

Optoelectronic packages and wafer level techniques for forming optoelectronic packages are described. In accordance with one apparatus aspect of the invention, a pair of substrates are bonded together to form an optical coupler. A first one of the substrates has a recess that faces the second substrate to at least in part define a channel suitable for receiving an optical transmission medium. A photonic device is mounted on a mounting surface of the second substrate that is opposite its bonded surface. The photonic device faces the reflective surface and an optical path is formed between the channel and the photonic element that both reflects off of the reflective surface and passes through the second substrate. In some embodiments an integrated circuit device and/or solder bumps are also attached to the mounting surface and the second substrate has conductive traces thereon that electrically couple the various electrical components as appropriate (e.g., the photonic device, the integrated circuit device, the solder bumps and/or other components). The substrates may be formed from a wide variety of materials including, glass, plastic and silicon. In some embodiments, at least the second substrate is formed from an optically transparent material and the optical path passes directly though the optically transparent material. In a method aspect of the invention, a variety of wafer level methods for forming such devices are described.

17 Claims, 5 Drawing Sheets

WAFER LEVEL OPTOELECTRONIC PACKAGE WITH FIBER SIDE INSERTION

TECHNICAL FIELD

The present invention relates generally to optoelectronic packages. More particularly, optoelectronic packages having side optical fiber insertion and wafer level methods for forming such packages are described.

BACKGROUND

Many packaged optoelectronic devices include both photonic devices and integrated circuits ("IC"). Such packages generally need to provide a mechanism suitable for optically coupling photonic elements on the photonic device to optical fibers and generally must be arranged in a manner that protects the integrated circuits and/or photonic devices from damage due to exposure to the outside environment. Accordingly, numerous conventional optoelectronic packages involve the formation of an optically transparent window or other transparent component that enables light to reach one or more photonic elements on the photonic device or, conversely, to be emitted by the photonic elements and exit the device.

While many of the existing optoelectronic packaging arrangements work well, there are continuing efforts to provide more reliable and cost effective ways for packaging optoelectronic devices.

SUMMARY

To achieve the foregoing and other objects of the invention, a variety of improved optoelectronic packaging arrangements are described. In accordance with one apparatus aspect of the invention, a pair of substrates are bonded together to form an optical coupler. A first one of the substrates has a recess that faces the second substrate to at least in part define a channel suitable for receiving an optical transmission medium. A photonic device is mounted on a mounting surface of the second substrate that is opposite its bonded surface. The photonic device has at least one photonic element thereon that faces the reflective surface. An optical path is formed between the channel and the photonic element that both reflects off of the reflective surface and passes through the second substrate.

In some embodiments an integrated circuit device and/or solder bumps are also attached to the mounting surface and the second substrate has conductive traces thereon that electrically couple the various electrical components as appropriate (e.g., the photonic device, the integrated circuit device, the solder bumps and/or other components)

In some embodiments, the recess in the first substrate extends beyond the fiber channel and includes a tapered wall that supports the reflector. The recess may also include a step that serves as an alignment stop for the optical fiber to precisely position the optical fiber relative to the reflector.

The optoelectronic device may be arranged to receive a single optical fiber or multiple optical fibers. When more than one photonic element is required, the photonic elements may be provided and positioned in a wide variety of different manners. For example, a single die may have multiple photonic elements, or multiple photonic devices may be mounted on the second substrate. When multiple optical fibers are desired, the coupler may include a plurality of distinct channels, or a single channel that receives a plurality of fibers.

The substrates may be formed from a wide variety of materials including, for example, glass, plastic and silicon. In some embodiments, at least the second substrate is formed from an optically transparent material and the optical path passes directly though the optically transparent material.

With many of the described arrangements, a longitudinal axis of the fiber channel extends substantially in parallel to the mounting surface of the second substrate, which provides a low profile.

In a method aspect of the invention, a variety of wafer level methods for forming optoelectronic devices are described. In one aspect a pair of preprocessed substrates are bonded together. The substrates may be wafers or may take any other suitable form, and each have a multiplicity of devices areas defined thereon. Each device area on the first substrate includes a recessed region and a reflective surface formed on a wall of the recessed region. Any of the other desired features, including the conductive traces and other features mentioned above may also be formed during preprocessing of the substrates. The second substrate has a mounting surface opposite its bonded surface. Photonic devices and other appropriate components are attached to the mounting surface such that each device area of the second substrate includes at least a photonic device.

After the bonding and component mounting has been completed, the bonded substrates (wafers) are singulated to form a multiplicity of singulated optoelectronic couplers, with each optoelectronic coupler corresponding to an associated device area on the bonded substrates. Each singulated optoelectronic coupler has a channel suitable for receiving at least one optical fiber that extends between the first and second substrates and is defined at least in part by the corresponding recessed region in the first substrate. Optical fibers may then be inserted into the singulated optoelectronic couplers as desired. The described approach provides an efficient, wafer level method for forming low profile optoelectronic devices.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF EXAMPLE EMBODIMENTS

Figure 1A:
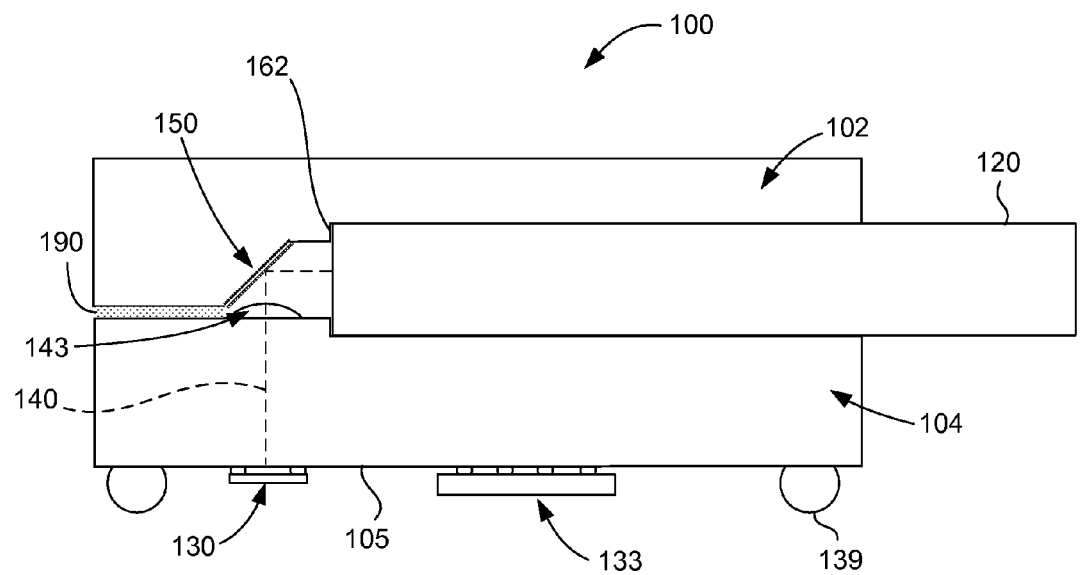
FIG. 1(a) is a diagrammatic cross sectional side view of an optoelectronic package in accordance with one embodiment of the present invention.
Figure 1B:
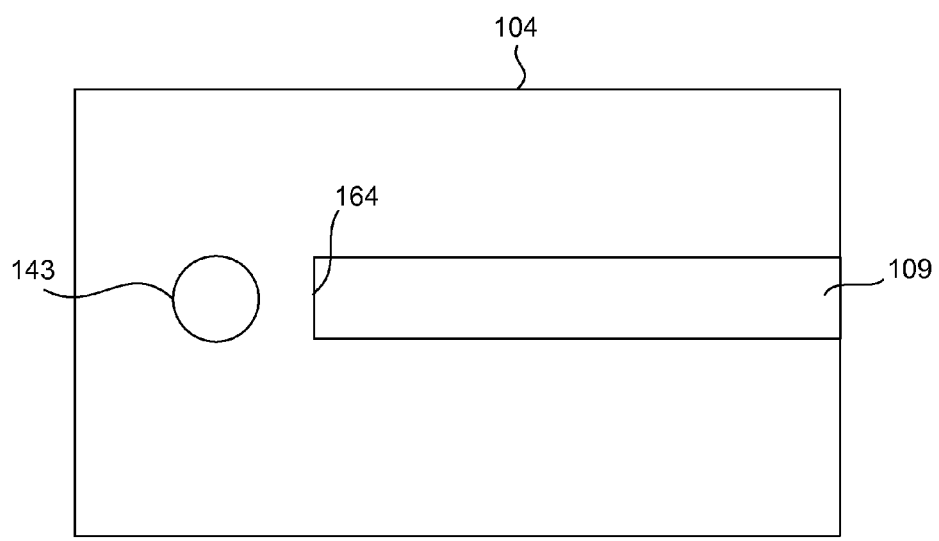
FIG. 1(b) is a diagrammatic cutaway top view of the bottom substrate 104 of the optoelectronic package illustrated in FIG. 1(a).
Figure 1C:
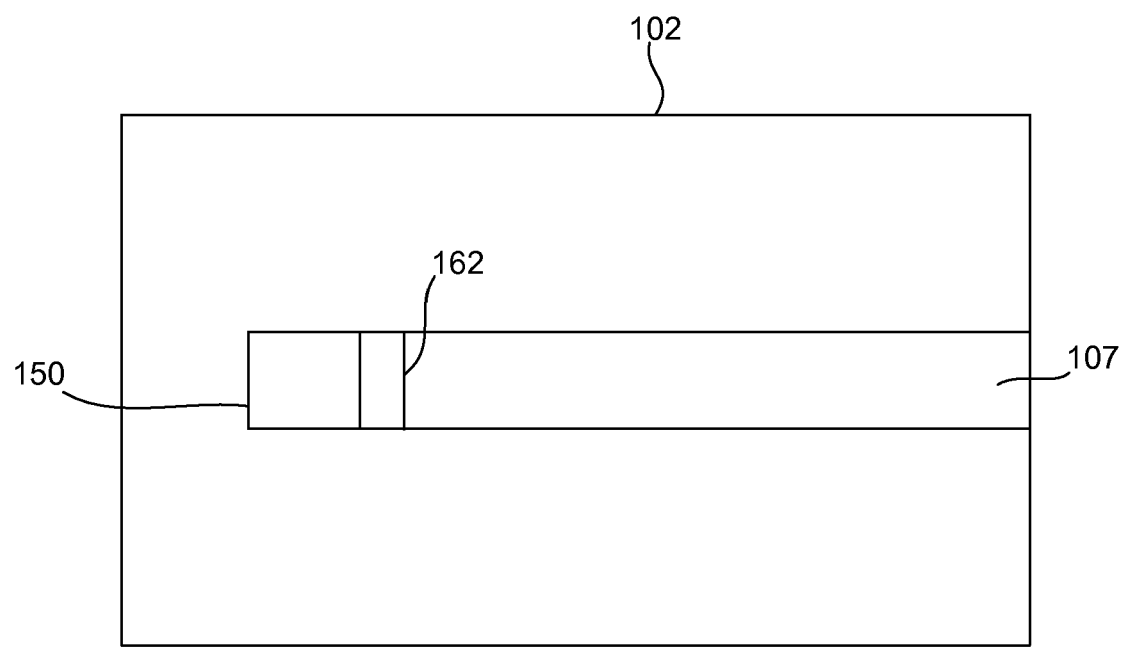
FIG. 1(c) is a diagrammatic cutaway bottom view of the top substrate 102 of the optoelectronic package illustrated in FIG. 1(a).
Figure 1D:
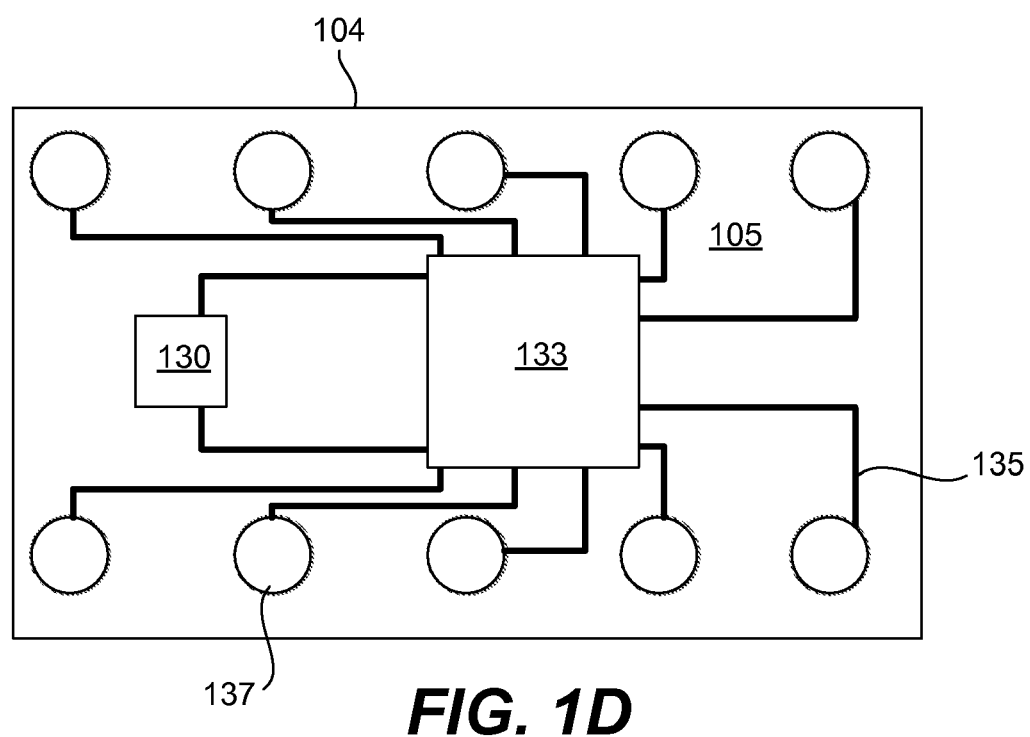
FIG. 1(d) is a diagrammatic bottom view of the optoelectronic package illustrated in FIG. 1(a).

The present invention relates generally to the packaging of optoelectronic devices. Referring initially to FIG. 1(a)-1(d), an optoelectronic package 100 in accordance with one embodiment of the invention will be described. The package includes a coupler 101 formed from a pair of substrates 102, 104 that are bonded together. The bonded substrates have facing fiber channel recesses 107, 109 that together form a side opening channel 111 suitable for receiving one or more optical fibers 120.

For the purposes of the description, the upper substrate 102 illustrated in FIG. 1(a) is referred to as the "top" substrate, and the lower substrate 104 in the drawing is referred to as the "bottom" substrate. However, it should be appreciated that the described package may be oriented in virtually any direction so the designations of the substrates as top and bottom is used arbitrarily for descriptive purposes only and is not intended to infer a specific orientation of the illustrated device in use or operation.

The bottom substrate 104 carries a photonic device 130 and an integrated circuit device 133. Electrical traces 135 (FIG. 1(d)) are formed on the bottom surface of the bottom substrate to electrically connect the integrated circuit device 133 to the photonic device 130 and to I/O pads 137. Electrical interconnects such as solder balls 139 may then be used to electrically and mechanically connect the I/O pads 137 (and thus the integrated circuit device 133) to external devices such as a printed circuit board or other suitable device or substrate.

The photonic device 130 may be any type of device that includes at least one photonic element that transmits or receives light signals. By way of example, in various embodiments, the photonic device 130 may include a semiconductor laser diode, as for example, a vertical-cavity surface-emitting laser (VCSEL). In these embodiments, the photonic device 130 may be configured to emit a laser beam. In one specific embodiment, the VCSEL may be configured to emit light having a wavelength of approximately 850 nm. In other embodiments, the photonic device 130 may include a photodetector that receives and detects light. In still other embodiments, the photonic device may function as a transceiver that both emits and receives light signals. Additionally, the photonic device 130 may have any desired number of photonic elements. As will be appreciated with those familiar with the art, there are a number of commercially available photonic devices that include multiple laser diodes and/or multiple photodetectors. In the embodiment illustrated in FIG. 1, a single photonic device having a single photonic element is provided. However, it should be appreciated that in other embodiments multiple (indeed any desired number of) photonic devices may be mounted on the bottom substrate 104 and each photonic device may have any desired number of photonic elements. When multiple numbers of photonic devices are provided, appropriate traces 135 may be formed on the bottom surface 105 of the bottom substrate 104 to provide the desired electrical connections between components.

The integrated circuit device 133 may include any type of integrated circuit intended to work with the photonic device 130. In some embodiments, the integrated circuit device may take the form of a flip chip die, while in others it may be a packaged or partially packaged device. In the illustrated embodiment, a single integrated circuit device is provided. However, again, it should be appreciated that any number of integrated circuit devices or other electrical components (e.g. passive components) may be mounted on bottom substrate 104. In still other embodiments, the functionality of the integrated circuit device can be combined with the photonic device in a single die.

An optical path 140 (illustrated by a dash line) is provided between the optical fiber and the photonic element of photonic device 130. In the illustrated embodiment, the optical path passes from the photonic element through the bottom substrate 104, through a lens 143 provided on the top surface of the bottom substrate, and reflects off of a minor (reflector or reflective surface) 150 carried by the top substrate to the optical fiber 120. The bottom substrate 104 is formed from an optically transparent material such as glass or plastic, which permits the optical path to pass through the substrate without requiring a through hole or via to be formed in the substrate 104.

As will be appreciated by those familiar with the art, in many optoelectronic applications it is desirable to precisely control the optical standoff distance between the photonic element and the optical transmission medium (e.g., optical fiber 120). The described arrangement permits good control of the optical distance between the photonic 130 device and the mirror 150. To precisely control the distance between the mirror 150 and the optical fiber 120, the fiber channel recess 107 formed in the top substrate has a step 162 arranged to function as an alignment stop for the optical fiber. The fiber channel recess 109 formed in the bottom substrate has an end wall 164 that is aligned with the step 162 such that the end wall 164 also functions as an alignment stop for the optical fiber. When the optical fiber 120 is inserted into the fiber channel 111 of optoelectronic package 100, it is pushed in until the fiber abuts against the alignment stops 162, 164. This facilitates good control of the effective optical standoff distance between the photonic device 130 and the optical fiber 120.

As mentioned above, in the embodiment illustrated in FIGS. 1(a)-1(d), the bottom substrate 104 is formed from a material such as glass or plastic that is optically transparent or translucent to at least the wavelengths of light used by the optoelectronic device 100. In other embodiments, other materials such as silicon may be used as the bottom substrate 104. However, when an optically opaque material such as silicon is used as the bottom substrate, a via or throughhole is needed in the bottom substrate in order to provide an optical path that extends through the bottom substrate between the top photonic device 130 and the mirror 150.

The geometry of the fiber channel 111 is designed to receive the optical fiber 120. By way of example, when the optoelectronic device is designed to receive a single optical fiber 120 as in the embodiment illustrated in FIG. 1, the fiber channel 111 may have a substantially circular or diamond shaped cross section. In such embodiments, the geometry of the facing channel recesses 107, 109 would be substantially semicircular or V-shaped troughs. Of course, a wide variety of other cross section geometries may be used as well and in some embodiments it may be desirable to taper portions of the fiber channel to make it easier to insert the optical fiber. When the optoelectronic device is designed for use with more than one optical fiber, multiple single fiber channels, or one or more multi-fiber channels may be provided to receive the appropriate optical fibers 120. When multiple single fiber channels are provided, they may be arranged side by side in parallel or in any other desired configuration. In the illustrated embodiments, the channels are designed to directly receive the optical fibers. However, in alternative embodiments, the channels could be arranged to receive a coupler that holds the ends of one or more optical fibers.

Referring next to FIG. 2, a method of forming optoelectronic packages such as the package 100 illustrated in FIG. 1 will be described. In the described embodiment, the top and bottom substrates 102, 104 are formed from wafers 202, 204 respectively. Each wafer has a large array of device areas formed thereon, with each device area corresponding to an individual optoelectronic package 100 when fabrication is complete. The number of device areas on a wafer may vary widely, although generally, each wafer may be arranged to have tens, hundreds or thousands, or even tens of thousands of device areas formed thereon. For clarity, in all of the FIGS. 2(a)-2(g), only a small segment of each wafer is illustrated that corresponds to just a single device area. However, it should be remembered that the fabrication would typically be done using substrates that have a large number of device areas defined thereon.

The device areas on the wafers 202 and 204 are arranged to match such that individual device areas align when the wafers are positioned adjacent one another. The geometry of the wafers may vary widely depending on the needs of any particular application. One advantage of the described approach is that it can be accomplished using conventional semiconductor fabrication equipment. Thus, in many applications, it may be desirable to utilize generally circular wafers sized to be handled by conventional semiconductor fabrication equipment. However, this is not a requirement and as previously mentioned, the size and geometry of the wafers may be widely varied.

The wafers may be formed from any material suitable for use as a substrate in an optoelectronic package and for use in wafer type processing. By way of example, glass, plastic and silicon wafers all work well. In some embodiments the wafers may be formed from transparent materials such as glass or high temperature optically transparent plastics (e.g., Ultem™ and Extem™).

Figure 2A:
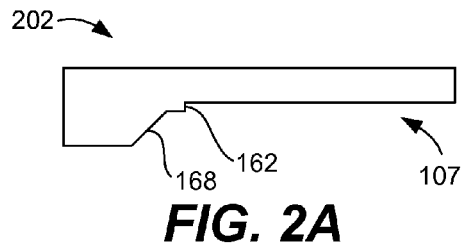
FIGS. 2(a)-2(g) are diagrammatic cross sectional side views of segments of wafers used in the fabrication of the optoelectronic package of FIG. 1(a) in accordance with one embodiment of the invention at various stages of a fabrication process.
Figure 2E:
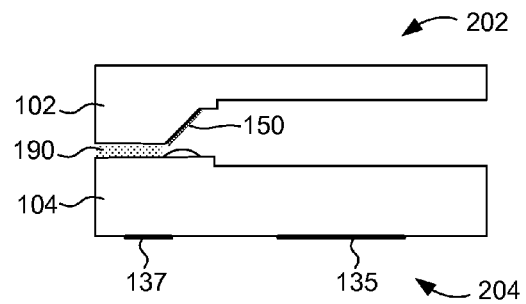
Figure 2B:
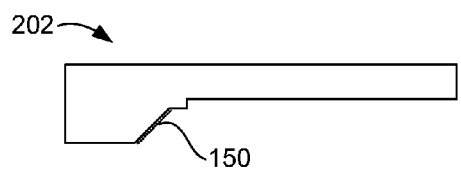
Figure 2C:
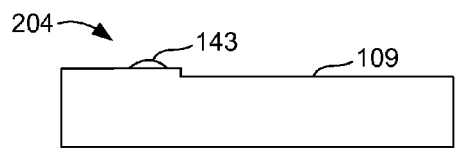
Figure 2F:
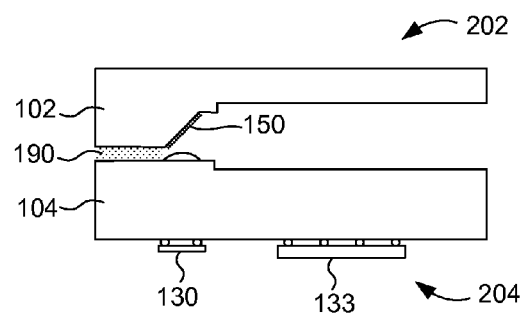
Figure 2D:
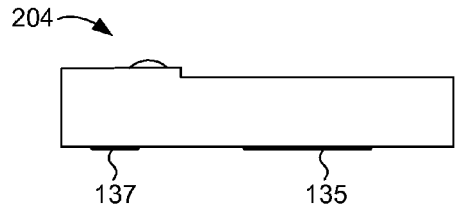

FIGS. 2(a) and 2(b) illustrate steps in the preprocessing of the top wafer 202. FIGS. 2(c) and 2(d) illustrate steps in preprocessing the bottom wafer 204. An advantage of the described wafer based approach to forming the substrates 102, 104 is that most or all of the features of the substrates may be formed at the wafer level using conventional wafer processing techniques.

The top wafer 202 may be formed from any material suitable for use as a substrate in an optoelectronic package and for use in wafer type processing. By way of example, glass, plastic and silicon wafers all work well. As seen in FIG. 2(a), the wafer 202 is initially patterned to form a recessed region in each device area. The recessed regions correspond to the fiber channel recesses 107 in the packaged devices and further include the alignment step 162 and a reflector support surface 168. The recesses may be formed in a variety of manners. In embodiments where the top wafer is formed from plastic, the recessed regions may be formed as part of a wafer molding operation. If materials that are not typically molded such as glass or silicon are used as the wafer substrate, then the top wafer may begin as a relatively standard blank wafer (not shown) and may be patterned to form a recessed region in each device area using standard wafer processing (e.g., etching) techniques.

The reflector support surface 168 may be tapered and is intended to support the reflector 150 in the finished package. The angle and geometry of the tapered surface may be varied to meet the needs of any particular application. By way of example, a simple tapered surface having a taper angle of 45 degrees works well in many applications. However, if desired, other reflective surface support geometries may be used, as for example a parabolic segment.

After the recessed regions have been formed a reflective surface may be deposited or otherwise formed on each of the reflector support surfaces as illustrated in FIG. 2(b). The reflective surfaces may be formed in a variety of manners, as for example by sputtering aluminum (Al) or silver (Ag) reflectors onto the tapered surfaces using conventional sputtering techniques. In the embodiment of the optoelectronic package 100 illustrated in FIG. 1, the mirror 150, the fiber channel recess 107 and the corresponding features (e.g., alignment step and tapered reflector surface 168 are the only features in the top substrate 102 and each of these features can be formed at the wafer level during preprocessing of the wafer 202 that forms the top substrate.

Most of the features of the bottom substrate 104 can also be formed at the wafer level during preprocessing of the bottom wafer 204. Like the top wafer 202, the bottom wafer 204 is patterned to form a recessed region in each device area as seen in FIG. 2(c). Again, the bottom wafer 204 may either be molded in a manner that includes the recessed regions or may begin as a relatively standard blank wafer (not shown) that is subsequently patterned using conventional semiconductor processing techniques. The recessed regions correspond to the fiber channel recesses 109 in the packaged optoelectronic devices 100 and the position of the end walls 164 are arranged to align with the steps 162 in top wafer 202 to serve as alignment stops for the optical fibers.

When desired, a lens 143 may also be formed or otherwise provided on the top surface of the bottom wafer 204 for each of the device areas. When the bottom wafer is formed from a transparent plastic material, the lenses may be formed together with the wafer as part of a molding operation. Wafers formed of different materials may have lenses formed thereon using appropriate processing techniques. In many embodiments the lenses are not necessary and may be eliminated completely.

After the appropriate recesses and lenses (if desired) have been formed, the back side of the wafer may be metalized to form the electrical traces 135 and I/O pads 137. Again, standard semiconductor wafer processing techniques can be used to form the electrical traces and I/O pads. Any appropriate metallurgy that is compatible with the substrate and other components may be used to form the electrical traces and I/O pads. In the illustrated embodiment, the I/O pads are used to support solder bumps and therefore conventional underbump metallization materials work well.

If features in addition to the fiber channel recesses, the electrical traces 135, the I/O pads 137 and the lenses 143 are desired for the bottom substrates, they may be formed during the preprocessing of the bottom substrate wafer 204 as well.

Once both the top and bottom substrate wafers 202 and 204 have been preprocessed, they may be bonded together as illustrated in FIG. 2(e). A wide variety of bonding techniques may be used to secure the wafers together. In the illustrated embodiment, an adhesive material 190 such as epoxy or Benzocyclobutene (BCB) may be used to bond the wafers together. In some embodiments, the adhesive may be a B-stageable materials such as B-stageable epoxies or a partially cured material such Benzocyclobetane which can be applied during the wafer pre-processing. An advantage of B-staging or partially curing the adhesive is that the adhesive may be applied and partially cured during wafer pre-processing so that it is hardened and easily handleable during subsequent processing. Later when the wafers are bonded together, the adhesive is softened and then more completely (or completely) cured thereby providing good adhesion between the bonded surfaces.

Although the described adhesive bonding techniques work well, it should be appreciated that in other embodiments a variety of other techniques may be used to attach the wafers together. For example, in some embodiments it may be desirable to solder the wafers together. When soldering is used, appropriate aligned metallic solder pads would typically be formed on the bottom surface of the top wafer 202 and the top surface of the bottom wafer 204 during wafer preprocessing. In other applications it may be desirable to use anodic or diffusion bonding techniques to secure the wafers together. By way of example, such techniques work particularly well when silicon wafers are used for both the top and bottom wafers.

Figure 2G:
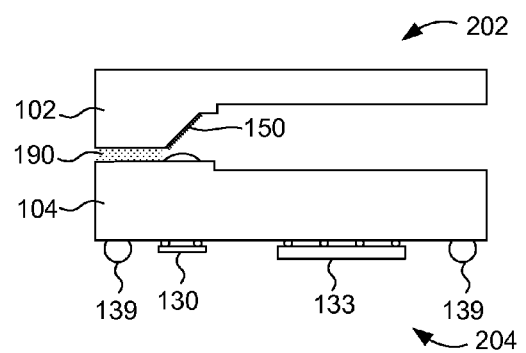

After the wafers have been bonded together, the photonic devices 130 and the integrated circuit devices 133 may be mounted at the appropriate locations on the bottom wafer as illustrated in FIG. 2(g). Any of a wide variety of component attachment techniques may be used to secure the photonic and integrated circuit devices to the bottom. By way of example, in the illustrated embodiment, the photonic device 130 and the integrated circuit device 133 are both flip chip type dice that may be soldered directly to appropriate bond pads formed on the bottom substrate. The bond pads may effectively be a part of the electrical traces 135 and utilize the same metallurgy as the I/O pads 137.

After the dice have been attached, solder bumps 139 may be formed on the bottom wafer using conventional wafer bumping techniques as illustrated in FIG. 2(g). After bumping, the bonded wafers are diced using standard wafer dicing techniques to produce a multiplicity of singulated optoelectronic packages. The optical fiber(s) may then be inserted into the packages and secured as desired.

In the process flow illustrated in FIGS. 2(a)-2(g), only the die mounting and wafer bumping steps are performed after the wafers are bonded together. However, it should be appreciated that other steps may also be performed after wafer bonding if desired. In other embodiments, the wafer bumping and/or the die/device attachment steps may be performed before the wafer bonding. Thus, it should be appreciated that although a particular order of the steps is articulated in the process flow described above, the order of the steps may be varied and some of the described steps may be altered or even eliminated as appropriate to produce a desired final package structure.

Figure 3:
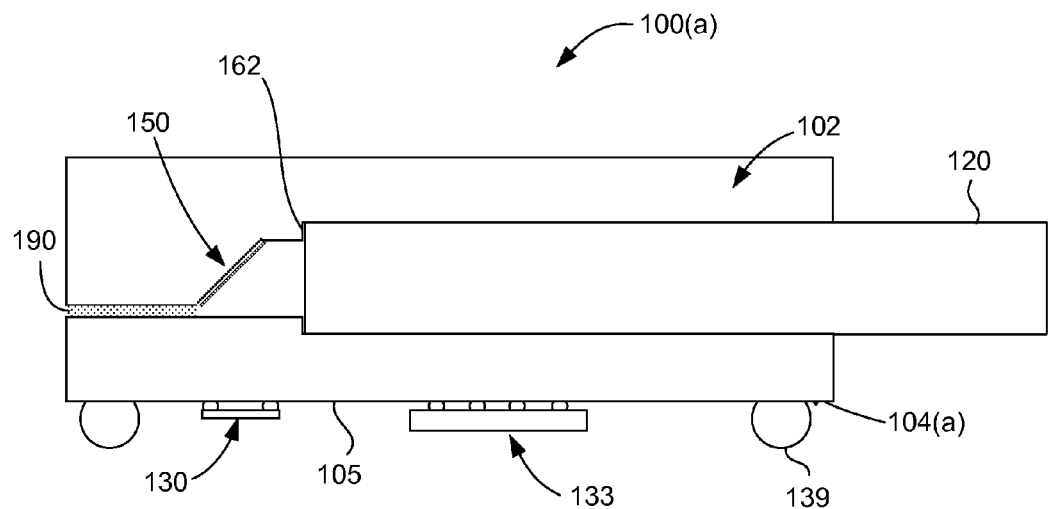
FIG. 3 is a diagrammatic cross sectional side view of an optoelectronic package in accordance with a second embodiment of the present invention that does not include a lens on the bottom substrate.

Referring next to FIG. 3, a second embodiment of the optoelectronic package 100(a) will be described. This embodiment is quite similar to the embodiment illustrated above in FIG. 1(a) but does not include a lens. Like the embodiment of FIG. 1(a), the bottom wafer is formed from a transparent material such as glass or plastic. The top wafer may be formed from any suitable material such as glass, plastic or silicon. In this embodiment, the bottom substrate 104(a) is thinner than the upper substrate 102. The illustrated package can be formed using the processes described above with respect to FIGS. 2(a)-2(g).

Figure 4:
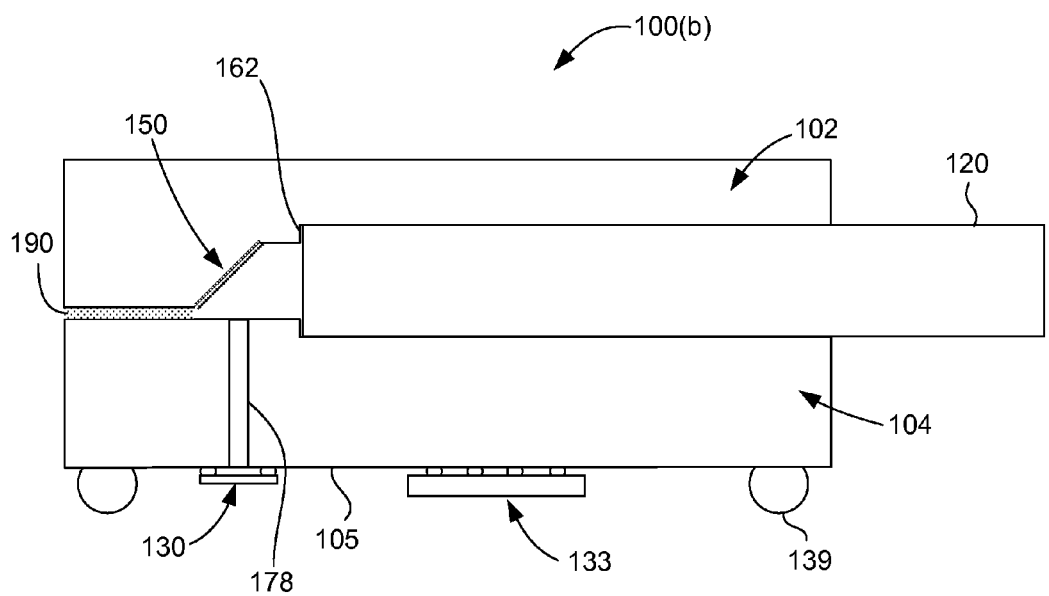
FIG. 4 is a diagrammatic cross sectional side view of an optoelectronic package in accordance with a third embodiment of the present invention.

FIG. 4 illustrates a third embodiment of the optoelectronic package 100(b). This embodiment is similar to the embodiments described above but differs in that the bottom substrate 102(b) is not transparent. Since the bottom substrate 102(b) is not transparent, a through hole or via 178 is formed through the bottom substrate 102(b) to provide the optical path 140 between a photonic element on the photonic device 130 and the minor 150. The via 178 may be a simple hole that is formed through the substrate or its edges may be metalized or otherwise coated with a reflective material so that light striking the via's sidewalls is not (or is less likely to be) absorbed by the substrate and rather passes between the photonic device and the minor. In still other embodiments, the vias may be filled with a transparent material.

Figure 5A:
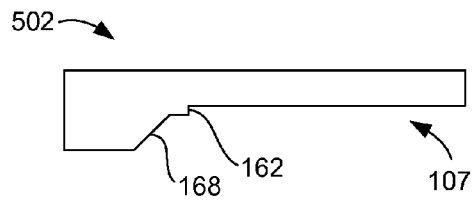
FIGS. 5(a)-5(g) are diagrammatic cross sectional side views of segments of wafers used in the fabrication of the optoelectronic package of FIG. 4 in accordance with one embodiment of the invention at various stages of a fabrication process.
Figure 5E:
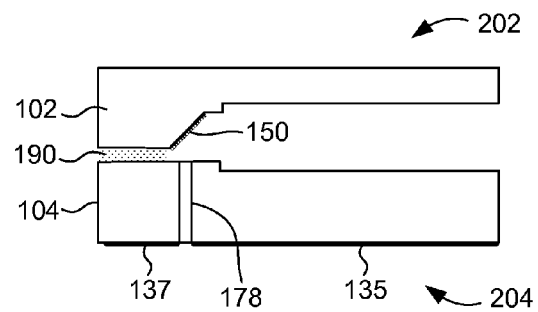
Figure 5B:
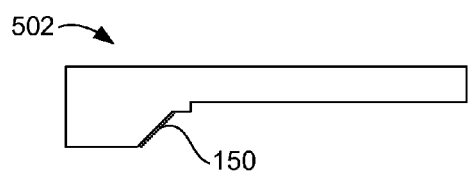
Figure 5F:
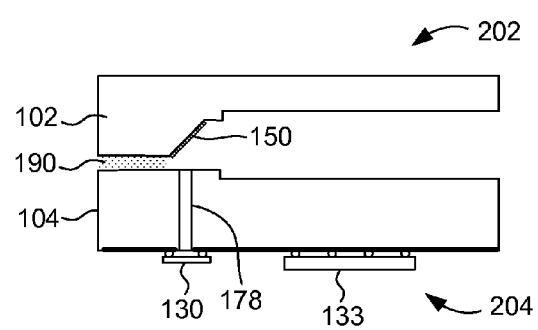
Figure 5C:
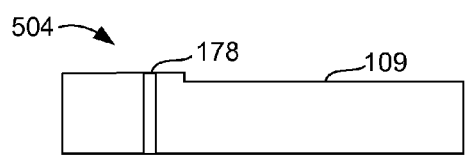
Figure 5D:
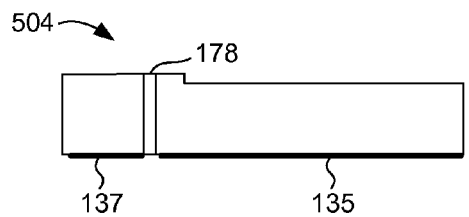
Figure 5G:
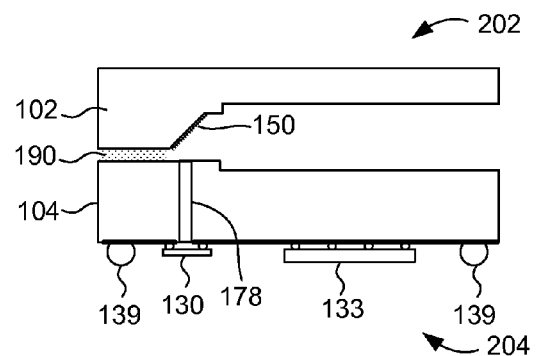

Generally, the package 100(b) can be formed using the process described above with respect to FIGS. 2(a)-2(g) with a few variations. A representative process for forming the optoelectronic package 100(b) is illustrated in FIGS. 5(a)-5(g) Generally, the vias 178 are formed during preprocessing of the bottom wafer 104(b) as illustrated in FIG. 5(c). The vias may be formed by a variety of techniques including etching, punching or micro-drilling techniques. In other respects, the process closely resembles the process steps described above with respect to FIGS. 2(a)-2(g).

If the top and bottom wafers 202, 204(b) are both formed from silicon, the wafer bonding may be done using ionic bonding, which provides a strong bond between the wafers.

Although only a few embodiments of the invention have been described in detail, it should be appreciated that the invention may be implemented in many other forms without departing from the spirit or scope of the invention. In the illustrated embodiments, the integrated circuit devices and the photonic devices took the form of flip chip style dice. However, it should be appreciated that either or both of these devices could take more heavily packaged forms. For example, the integrated circuit devices could be embodied in leadless leadframe packages (LLP) sometimes referred to as QFN (quad flat pack—no lead) packages; grid array type packages or a variety of other surface mount type packages.

As mentioned above, the substrates may be formed from a wide variety of materials. By way of example, plastic, glass and silicon wafers all work well. When transparent materials such as glass or plastic are used as the bottom substrate, vias do not necessarily need to be formed in the bottom substrate in order to provide an optical path between the photonic device and the reflective surface. When plastics are used, high-temperature rated thermoplastics that are suitable for use in semiconductor packaging applications such as polyetherimide (e.g., (e.g., Ultem™, Siltem™, or Extem™) or other polyimides tend to work particularly well, although a variety of other plastics may be used as well.

It should be appreciated that the described arrangement provides a compact optical coupler structure that allows an optical fiber to be side inserted into the optoelectronic coupler in a manner such that its longitudinal axis substantially parallel to the plane of the face of the photonic device. Stated another way, the longitudinal axis of the fiber channel, and thus the optical fiber extends in parallel with the surface (i.e., the bottom surface of the bottom substrate) that the photonic and integrated circuit devices are mounted on. This provides a low profile structure for optically coupling the photonic device to the optical fiber.

The various embodiments may be formed using wafer level processes. Although specific sequences of steps have been described, it should be appreciated that in many instances the order of the steps may be varied and some steps eliminated and others added without departing from spirit of the invention. Therefore, the present embodiments should be considered illustrative and not restrictive and the invention is not to be limited to the details given herein, but may be modified within the scope and equivalents of the appended claims.

What is claimed is:

1. An optoelectronic device comprising:
a first substrate including a reflector and a first surface having a first channel recess;
a second substrate having opposing first and second surfaces, wherein the first surface of the second substrate is bonded to the first surface of the first substrate to form an optical coupler, the first surface of the second substrate having a second channel recess that is generally aligned with the first channel recess and cooperates with the first channel recess to form a fiber channel suitable for receiving an optical fiber;
a photonic device mounted on the second surface of the second substrate, the photonic device having at least one photonic element thereon that faces the reflector, wherein an optical path is formed between the fiber channel and the photonic element that reflects off of the reflector and passes through the second substrate;
an integrated circuit device mounted on the second surface of the second substrate; and
electrical conductor traces formed on the second substrate, wherein at least some of the traces electrically connect the integrated circuit device to the photonic device;
wherein the first channel recess includes a step that serves as an alignment stop for the optical fiber, the step being spaced apart from the reflector; and
wherein the optical fiber is arranged to register against the step.

2. An optoelectronic device as recited in claim 1 further comprising:
a multiplicity of I/O pads formed on the second surface of the second substrate, wherein at least some of the I/O pads are electrically connected to the integrated circuit device by associated electrical conductor traces; and
a multiplicity of solder bumps attached to I/O pads to facilitate electrical connection of the optoelectronic device to an external device.

3. An optoelectronic device as recited in claim 1 wherein:
the first surface of the first substrate and the first and second surfaces of the second substrate are generally parallel; and
the reflector is formed in a reflector recess formed in the first surface of the first substrate that is contiguous with the first channel recess.

4. An optoelectronic device as recited in claim 1 wherein the first surfaces of the first and second substrates each include a plurality of aligned channel recesses that cooperate to form a plurality of distinct fiber channels each suitable for receiving an optical fiber.

5. An optoelectronic device as recited in claim 1 wherein the fiber channel is arranged to receive a plurality of optical fibers.

6. An optoelectronic device as recited in claim 1 further comprising a plurality of optical fibers, wherein the photonic device includes a plurality of photonic elements, there being an optical path between each photonic element and an associated one of the optical fibers.

7. An optoelectronic device as recited in claim 1 further comprising a plurality of optical fibers and wherein a plurality of photonic devices are mounted on the second substrate, each photonic device including at least one photonic element, there being an optical path between each photonic element and an associated one of the optical fibers.

8. An optoelectronic device as recited in claim 1 wherein the second substrate is formed from an optically transparent material and the optical path passes directly through the optically transparent material.

9. An optoelectronic device comprising:
a first substrate including a reflector and a first surface having a first channel recess;
a second substrate of optically transparent material having opposing first and second surfaces, wherein the first surface of the second substrate is bonded to the first surface of the first substrate to form an optical coupler, the first surface of the second substrate having a second channel recess that is generally aligned with the first channel recess and cooperates with the first channel recess to form a fiber channel receiving an optical fiber;
a photonic device mounted on the second surface of the second substrate, the photonic device having at least one photonic element thereon that faces the reflector, wherein an optical path is formed between the fiber channel and the photonic element that reflects off of the reflector and directly passes through the optically transparent second substrate;
an integrated circuit device mounted on the second surface of the second substrate; and
electrical conductor traces formed on the second substrate, wherein at least some of the traces electrically connect the integrated circuit device to the photonic device,
wherein the second substrate is formed from a plastic material and includes an integrally molded lens formed on the first surface of the second substrate in the optical path between the photonic element and the reflector.

10. An optoelectronic device as recited in claim 1 wherein the first and second substrates are formed from materials selected from group consisting of glass, plastic and silicon.

11. An optoelectronic device as recited in claim 1 wherein the first and second substrates are formed from silicon and the second wafer has a via formed therethrough that provides a portion of the optical path between the photonic element and the reflector, the optoelectronic device further comprising an ionic bond between the first and second substrates.

12. An optoelectronic device as recited in claim 3 wherein the reflector is formed on a tapered surface that is angled at approximately 45 degrees relative to an axis of the optical path between the photonic element and the reflector such that light passing between the photonic element and the fiber channel is redirected approximately 90 degrees by the reflector.

13. An optoelectronic device as recited in claim 1 wherein a longitudinal axis of the fiber channel extends in a plane that is substantially parallel to the second surface of the second substrate.

14. An optoelectronic device comprising:
first and second substrates having first surfaces that are bonded together, the first and second substrates each having a channel recess in their first surface, the channel recesses being aligned and arranged to cooperate to define a channel suitable for receiving an optical transmission medium, the second substrate further including a second surface that is generally opposite the first surface of the second substrate;
a reflective surface on the first substrate; and
a photonic device mounted on the second surface of the second substrate, the photonic device having at least one photonic element thereon that faces the reflective surface, wherein an optical path is formed between the channel and the photonic element that reflects off of the reflective surface and passes through the second substrate; and
wherein at least one of the recesses includes a step distinct from the reflective surface that serves as an alignment stop for the optical transmission medium to facilitate precisely positioning a first end of the optical transmission medium relative to the reflective surface.

15. An optoelectronic device comprising:
an optical fiber coupler formed from a pair of bonded substrates, the coupler being arranged to receive and align a first end of an inserted optical fiber, wherein the optical fiber has a longitudinal axis that extends substantially in parallel with a mounting surface of the coupler;
a photonic device mounted on the mounting surface, the photonic device including a photonic element that faces the mounting surface;
a mirror for redirecting light between the optical fiber and the photonic element, the mirror being formed on a first one of the substrates; and
wherein the mounting surface is an external surface of a second one of the substrates and the optical fiber is received in a fiber channel formed at least in part by a recess formed in a surface of the first substrate that is bonded to the second substrate; and
wherein the recess includes a first recess portion and a second recess portion, the second recess portion having a cross sectional dimension that is less than a corresponding cross sectional dimension in the first recess portion that serves as an alignment stop to facilitate precise positioning of a first end of the optical fiber relative to the minor, and wherein the second recess portion serves as an optical path between the optical fiber and the minor.

16. An optoelectronic device as recited in claim 15 wherein the minor is located at an internal end of the recess.

17. An optoelectronic device as recited in claim 16, wherein the recess further includes a step that serves as the alignment stop for the optical fiber to facilitate precisely positioning the first end of the optical fiber relative to the mirror, the step being spaced apart from the mirror.

* * * * *

UNITED STATES PATENT AND TRADEMARK OFFICE
CERTIFICATE OF CORRECTION

PATENT NO. : 7,703,993 B1  Page 1 of 1
APPLICATION NO. : 12/337533
DATED : April 27, 2010
INVENTOR(S) : Darbinyan et al.

It is certified that error appears in the above-identified patent and that said Letters Patent is hereby corrected as shown below:

Col. 4, line 18,   change "minor" to --mirror--.
Col. 8, line 3,    change "minor" to --mirror--.
Col. 8, line 8,    change "minor" to --mirror--.

Col. 12, line 8 (Claim 15),   change "minor" to --mirror--.
Col. 12, line 9 (Claim 15),   change "minor" to --mirror--.
Col. 12, line 11 (Claim 16),  change "minor" to --mirror--.

Signed and Sealed this

Twenty-seventh Day of July, 2010

David J. Kappos
*Director of the United States Patent and Trademark Office*